United States Patent [19]
Arrow et al.

[11] Patent Number: 6,154,839
[45] Date of Patent: Nov. 28, 2000

[54] TRANSLATING PACKET ADDRESSES BASED UPON A USER IDENTIFIER

[75] Inventors: Leslie J. Arrow, Mountain View; Henk J. Bots, Hollister; Mark R. Hoke, San Jose; William E. Hunt, Saratoga; Bruce T. Huntley, San Jose, all of Calif.

[73] Assignee: VPNet Technologies, Inc., Milpitas, Calif.

[21] Appl. No.: 09/065,898

[22] Filed: Apr. 23, 1998

(Under 37 CFR 1.47)

[51] Int. Cl.⁷ .......................................................... H04L 9/32
[52] U.S. Cl. .......................... 713/154; 713/162; 713/201; 709/245
[58] Field of Search ................................... 713/153, 162, 713/200, 201, 154; 709/245

[56] References Cited

U.S. PATENT DOCUMENTS

| | | | |
|---|---|---|---|
| 4,677,588 | 6/1987 | Benjamin et al. | 709/245 |
| 5,511,122 | 4/1996 | Atkinson | 713/153 |
| 5,583,940 | 12/1996 | Vidrascu et al. | 713/153 |
| 5,757,924 | 5/1998 | Friedman et al. | 713/153 |
| 6,006,272 | 12/1999 | Aravamudan et al. | 709/245 |

*Primary Examiner*—Gilberto Barron, Jr.
*Attorney, Agent, or Firm*—Park & Vaughan LLP

[57] ABSTRACT

One embodiment of the present invention includes a system that translates addresses in a data packet based upon a user identifier in the data packet. The system receives the data packet sent from a source node to a destination node by a user. This data packet includes a source address of the source node, a destination address of the destination node and the user identifier that identifies the user. The system uses the user identifier to look up communication privileges associated with the user. If the communication privileges allow the user to communicate with the destination node, the system replaces the source address in the data packet with a privileged address, and forwards the data packet to the destination node. In a variation on this embodiment, the privileged address is recognized by a system firewall so that it facilitates passage of the packet through firewall. In another variation, the privileged address specifies a return address of a given address translation unit and thereby facilitates load balancing across multiple address translation units. In a further variation, the system receives a reply packet from the destination node directed to the privileged address, and replaces the privileged address in the reply packet with the source address so that the reply packet is directed to the source node, before forwarding the reply packet to the source node. In another variation, receiving the reply packet includes acting as a proxy for the privileged address under the address resolution protocol. Another variation further includes authenticating, encrypting and optionally compressing the data packet.

25 Claims, 9 Drawing Sheets

TRANSLATING PACKET ADDRESSES BASED UPON A USER IDENTIFIER

BACKGROUND

1. Field of the Invention

The present invention relates to the field of data communication. More specifically, the present invention relates to a method and apparatus for translating packet addresses based upon a user identifier in the data packet.

2. Related Art

In recent years organizations have come to rely heavily on the ability to communicate data electronically between members of the organization. Such communications typically include electronic mail and file sharing or file transfer. In a centralized, single site organization, these communications are most commonly facilitated by a local area network (LAN) installed and operated by the enterprise.

Preventing unauthorized access to data traversing an enterprise's LAN is relatively straightforward. As long as intelligent network management is maintained, unauthorized accesses to data traversing an enterprise's internal LAN can be prevented. It is when the enterprise spans multiple sites that security threats from the outside become a considerable problem.

For distributed enterprises that want to communicate data electronically several options exist today; but each has associated disadvantages. The first option is to interconnect the offices or various sites with dedicated, or private, communication connections, often referred to as leased lines. This is the traditional method that organizations use to implement a wide area network (WAN). The disadvantages of implementing an enterprise-owned and controlled WAN are obvious: they are expensive, cumbersome and frequently underutilized if they are configured to handle the peak capacity requirements of the enterprise. The obvious advantage is that the lines are dedicated for use by the enterprise and are therefore reasonably secure from eavesdropping or tampering by intermediate third parties.

An alternative to dedicated communication lines is for an enterprise to handle inter-site data distributions over the emerging public network space. In recent years, the Internet has evolved from being primarily a tool for scientists and academics into an efficient mechanism for global communications. The Internet provides electronic communications paths between millions of computers by interconnecting the various networks upon which those computers reside. It has become commonplace, even routine, for enterprises, even those in non-technical fields, to provide Internet access to at least some portion of the computers within the enterprises. For many businesses this facilitates communications with customers and potential business partners as well as to geographically distributed members of the organization.

Distributed enterprises have found that the Internet is a convenient mechanism for providing electronic communications between members of the enterprise. For example, two remote sites within an enterprise may each connect to the Internet through a local Internet Service Provider (ISP). This enables the various members of the enterprise to communicate with other sites on the Internet, including those within their own organization. A large disadvantage of using the Internet for intra-enterprise communications is that the Internet is a public network. The route by which data communication travel from point to point can vary on a per packet basis, and is essentially indeterminate. Furthermore, the data protocols for transmitting information over the constituent networks of the Internet are widely known, leaving electronic communications susceptible to interception and eavesdropping with packets being replicated at most intermediate hops. An even greater concern is the fact that communications can be modified in transit or even initiated by impostors. With these disconcerting risks, most enterprises are unwilling to subject their proprietary and confidential internal communications to the exposure of the public network space. For many organizations it is common today to not only have Internet access provided at each site, but also to maintain the existing dedicated communications paths for internal enterprise communications, with all of the attendant disadvantages described above.

To remedy this problem, organizations have begun to build "virtual private networks" (VPNs) on top of public networks, such as the Internet, to protect data transmitted over public networks. Virtual private network systems often rely on virtual private network units, which are in the path of all relevant data traffic between an enterprise site and the public network. To ensure secure data communications between members of the same VPN, a VPN unit implements a combination of techniques for data communication between members of the VPN. These techniques can include various combinations of compression, encryption and authentication.

A number of challenges exist in designing and building virtual private network systems. One challenge is to integrate effectively with existing network security mechanisms. Private local area networks (LANs) are often coupled to a public network through some type of gateway or bridge. In order to prevent unauthorized accesses from the public network, these private LANs often implement a "firewall" to filter communications with the public network so that only communications to recognized addresses on the public network are allowed to pass through the firewall.

A firewall can present a problem for a remote client attempting to connect to a VPN from an unknown network addresses. It may be possible to configure the firewall to allow messages from all possible addresses on the network (including the remote client's address) to pass through the firewall. However, allowing such configuration of a firewall creates security risks, because it may allow malicious users to pass a message through the firewall. Furthermore, it may not be possible to configure the firewall in this way, if the firewall already exists or was implemented by a third party.

What is needed is a method for allowing communications from a remote client to pass through a firewall without modifying the firewall.

Another challenge in building a virtual private network is to balance load between virtual private network units (VPN units). For performance reasons it is often advantageous to couple a private network to a public network through multiple VPN units. In this configuration, it is desirable to distribute the communication load across the multiple VPN units.

What is needed is a mechanism that facilitates load balancing across multiple VPN units that couple a private network to a public network.

SUMMARY

One embodiment of the present invention includes a system that translates addresses in a data packet based upon a user identifier in the data packet. The system receives the data packet sent from a source node to a destination node by a user. This data packet includes a source address of the source node, a destination address of the destination node and the user identifier that identifies the user. The system uses the user identifier to look up communication privileges associated with the user. If the communication privileges allow the user to communicate with the destination node, the system replaces the source address in the data packet with a privileged address, and forwards the data packet to the destination node. In a variation on this embodiment, the privileged address is recognized by a system firewall so that it facilitates passage of the packet through firewall. In another variation, the privileged address specifies a return address of a given address translation unit and thereby facilitates load balancing across multiple address translation units. In a further variation, the system receives a reply packet from the destination node directed to the privileged address, and replaces the privileged address in the reply packet with the source address so that the reply packet is directed to the source node, before forwarding the reply packet to the source node. In another variation, receiving the reply packet includes acting as a proxy for the privileged address under the address resolution protocol. Another variation further includes authenticating, encrypting and optionally compressing the data packet.

DEFINITIONS

Figure 1:
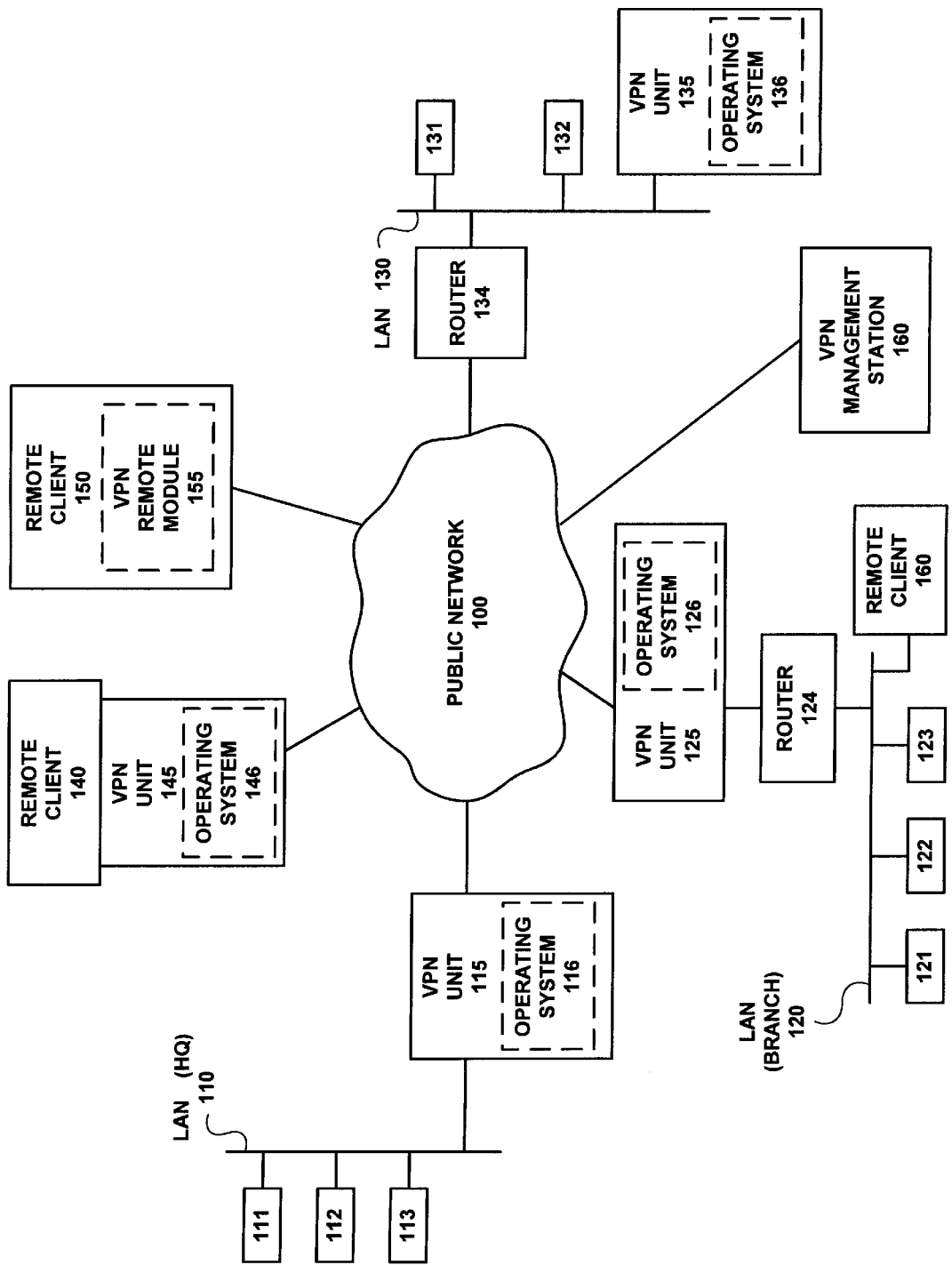
FIG. 1 illustrates a public network 100 including VPN units 115, 125, 135 and 145 operating under control of VPN management station 160 in accordance with an aspect of the present invention.

Communication Privileges—Rights assigned to a user or a node on a network to that specify access rights protected nodes on the network.

Configuration Parameters—parameters sent to a VPN unit to configure the VPN unit to appropriately handle communications between members of VPNs.

Firewall—A security mechanism that filters communications so that only communications that meet certain criteria are allowed to pass through. Firewalls in communication systems typically allow communications between privileged addresses.

Group of Nodes—a group of nodes on a public network. In one variation, these nodes belong to the same local network. In another variation, these nodes are specified by at least one net/mask pair.

Local Address—an address on the same enterprise network (or local network), wherein the enterprise network is separated logically or physically from a public data network by a VPN unit.

Local Network—an enterprise network (or a local network) separated logically or physically from a public data network by a VPN unit.

Net/Mask Pair—a specification for a group of network addresses including a network ID and a network address mask.

Network Group—same as group of nodes.

Non-local Address—an address on a different enterprise network (or local network), wherein enterprise networks are separated logically or physically from a public data network by a VPN unit.

Privileged Address—an address that can communicate with protected nodes on a network. The protected nodes are often protected by a firewall (defined above).

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Although the present invention is described predominantly in terms of utilizing the Internet as a communications medium, the concepts and methods are broad enough to accomplish the implementation of secure virtual private networks over other public or insecure communications media. Throughout this detailed description, numerous specific details are set forth, such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the VPN unit to be described further herein may be implemented in software running on a computer system, or implemented in hardware utilizing either a combination of microprocessors or other specially designed application specific integrated circuits, programmable logic devices, or various combinations thereof.

Description of Virtual Private Networks

FIG. 1 illustrates a public network 100 including VPN units 115, 125, 135 and 145 operating under control of VPN management station 160 in accordance with an embodiment of the present invention. Public network 100 may be any type of communication channel, including, but not limited to, data networks such as the Internet. VPN unit 115 couples headquarters local area network (LAN) 110 to public network 100 through router 114. Headquarters LAN 110 is illustrated with three endstations 111, 112, and 113, respectively coupled to headquarters LAN 110. Likewise, VPN unit 125 couples branch LAN 120 to public network 100 through router 124. Branch LAN 120 is shown having a plurality of endstations 121, 122 and 123, respectively, coupled to branch LAN 120. LAN 130 is coupled to public network 100 through router 134. LAN 130) is illustrated in FIG. 1 as comprising of plurality of computers, 131 and 132, coupled to communicate data packets over LAN 130. Note that in LAN 130, VPN unit 135 is not located between router 134 and network 100, but rather is located on LAN 130. In this configuration, secure communications between LAN 130 and public network 100 pass through VPN unit 135. VPN unit 135 acts as an endpoint for a tunnel for secure communications through public network 100. The local area networks utilized for data communications within headquarters LAN 110, branch LAN 120, LAN 130 and other sites may adhere to a wide variety of network protocols, the most common of which are Ethernet and Token Ring. Remote clients 140, 150 and 160 are systems coupled to public network 100 from remote locations. It is frequently desirable for other members of the enterprise who may be on the road or working from home or other remote locations to exchange data with other members of the enterprise. Thus, remote clients 140, 150 and 160 may communicate with the headquarters LAN 110 over long distance telephone lines. Alternatively, remote clients 140, 150 and 160 may have access to public network 100 through local Internet service providers (ISPs).

Remote clients 140, 150 and 160 are coupled to public network 100 in a number of different ways. Remote client 140 is coupled to public network 100 through an attached hardware VPN unit 145, which is much like VPN units 115, 125 and 135. In contrast, emote client 150 is coupled directly to public network 100. In this configuration, virtual private network functions are implemented through VPN remote module 155, which is a software module within remote client 150. VPN remote module 155 operates in conjunction with communication software in remote client 150 to connect the remote client 150 to public network 100. Remote client 160 is coupled to branch LAN 120, and can thereby connect to public network 100 through VPN unit 125.

Note that the network address for a remote client can change between sessions, because the remote client may attempt to connect from a different location for each session. In one embodiment, a network address is dynamically loaded into a client through the dynamic host configuration protocol (DHCP). This DHCP address does not have to be a fixed address for the client, but rather, can change between sessions.

VPN units 115, 125, 135 and 145 include operating systems 116, 126, 136 and 146, respectively, which control the operation of VPN units 11 5, 125, 135 and 145. The internal structure of these operating systems is described in more detail below with reference to FIG. 7.

VPN management station 160 controls VPN units 115, 125, and 135 through commands and configuration information transmitted to VPN units 115, 125 and 135 through public network 100. VPN management station 160 may be implemented in software running on a computer system, or alternatively may be implemented in hardware utilizing either a combination of microprocessors or other specially designed application specific integrated circuits, programmable logic devices, or various combinations thereof. The structure of VPN management station 160 is described in more detail below with reference to FIGS. 4 and 5.

LANs 120 and 130 ultimately connect to public network 100 through associated routing or gateway devices, which are identified as routers 124 and 134, respectively. Data packets conveyed between the various sites illustrated in FIG. 1 generally traverse a plurality of additional routing devices on their way between the source and destination sites for the packets. The mechanisms for data packet transfers over a public network 100, such as the Internet are well known and are not described in great detail herein. In one embodiment, packets are assembled in accordance with the Internet Protocol (IP) and are referred to herein as IP packets regardless of the version of the Internet protocol presently in effect.

In contrast, LAN 110 is coupled to public network 100 through VPN unit 115, without an attached router. In this configuration, VPN unit 115 performs the same routing functions as routers 124 and 134. These routing functions have been folded into VPN unit 115.

The illustrated placement of VPN units in the overall system architecture represents only one placement choice. Other configurations are possible. The only requirement is that data traffic is routed through the VPN units. In another embodiment, a VPN unit is located on the LAN side of a site's router.

VPN units maintain lookup tables for identifying members of specific virtual private network groups. When a data packet is sent between source and destination addresses that are both members of the same VPN, the VPN unit processes the data packet from the sending side ensuring that it is compressed, if necessary, properly encrypted, that authentication information is added to it. Likewise, the receiving VPN unit servicing the destination site will detect that a packet is being propagated between members of the same VPN. The receiving VPN unit authenticates, decrypts and decompresses the packet (if necessary) before forwarding it toward the destination endstation. In this way, secure data communications between end users is achieved in a manner that is transparent to the end users.

Figure 2:
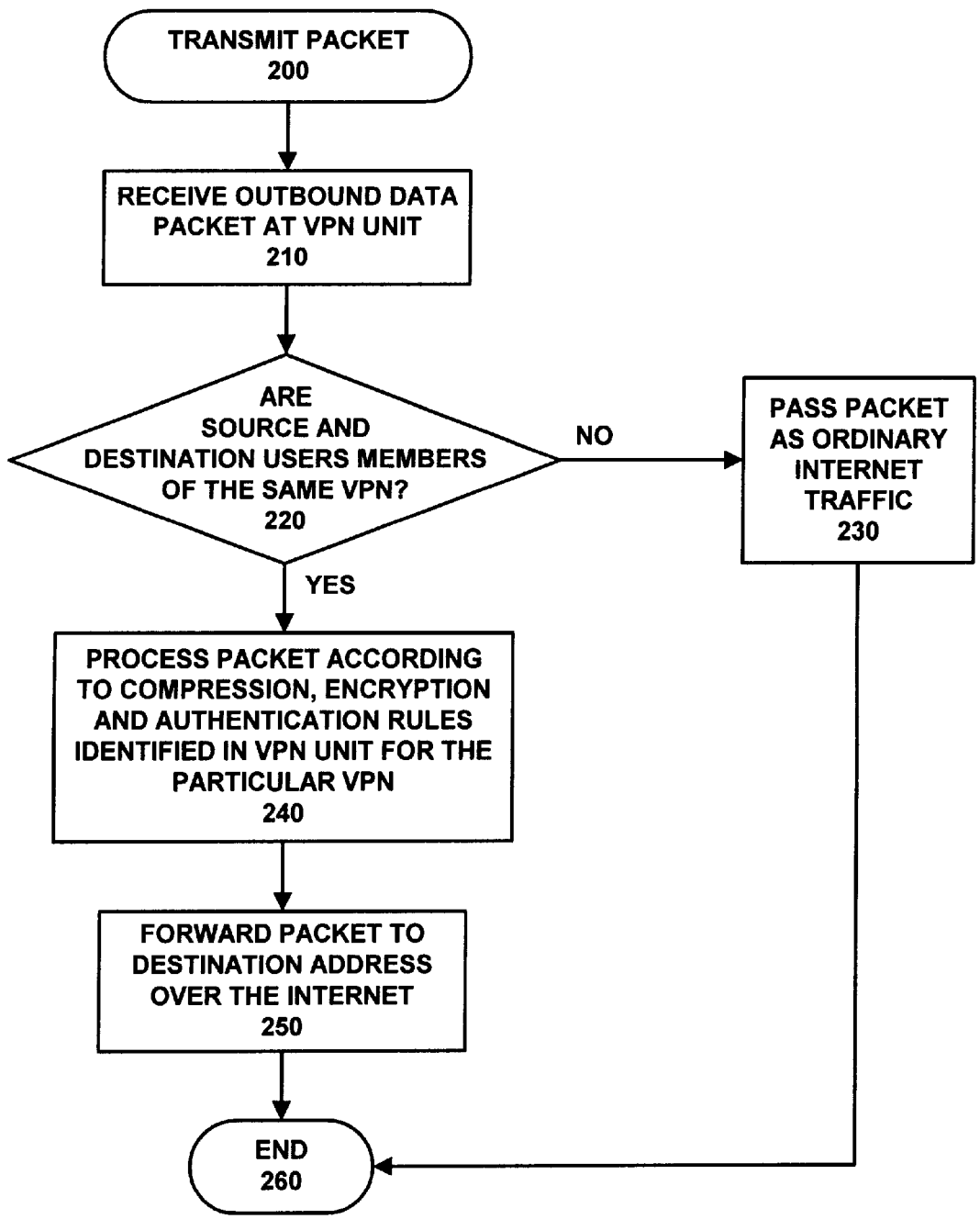
FIG. 2 is a flow chart illustrating the processing of a packet being transmitted from one member of a VPN to another member of the VPN over a public data network in accordance with an aspect of the present invention.

FIG. 2 is a flow chart illustrating the processing of a packet being transmitted from one member of a VPN to another member of the VPN over a public data network in accordance with an embodiment of the present invention. When a data packet originates from an endstation, such as endstation 112 of LAN 110, and it is destined for a remote site, outside of LAN 110, the packet is initially be treated as an ordinary Internet data packet. The packet is first encapsulated at endstation 112 in accordance with the Internet Protocol, forming an outbound IP packet. Next, the packet proceeds from endstation 112 over LAN 110 to router 114. On its way out of the site, the IP packet passes through the associated VPN unit 115 for the site. Alternatively, when a data packet originates from a remote client, such as remote client 150, the VPN functions are performed by VPN remote module 155 within remote client 150.

The flowchart illustrated at FIG. 2 shows how a VPN unit (or a VPN remote module within a remote client) processes an outbound packet. The transmit procedure 200 begins when the outbound data packet is received at the VPN unit in state 210. At decision box 220, the system determines whether or not the source and destination addresses for the data packet are both members of the same VPN. This determination may be made with reference to lookup tables that are maintained by the VPN units or by referencing to other memory mechanisms. This state may be thought of as member filtering for data packets being transmitted between the particular site and the VPN unit which services it. If the source and destination address for the data packet are not both members of the same VPN, then at state 230 the packet is forwarded to the Internet as ordinary Internet traffic from the site, as though the VPN unit were not involved. In this case, the system proceeds to state 260, which is an end state. In an alternative embodiment, the system discards data traffic that is not between members of a VPN, rather than forwarding it as unsecure traffic. In another embodiment, the system provides the option to either pass or discard non-VPN group data traffic.

If, at decision box 220, the system determines that both the source and destination addresses for the data packet are members of the same VPN, the data packet is processed at state 240 undergoing various combinations of compression, encryption and authentication. If a packet is received from a remote client that is not currently authenticated, the system attempts to authenticate the remote client. If authentication is successful, the system dynamically retrieves configuration information for the remote client from a database. The remote client will then retry its communication.

Lookup tables maintained by VPN unit 115 and all of the other VPN units identify members of particular VPNs. They additionally identify whether or not data packets transferred between members of the particular VPN are to be compressed, and if so, what algorithm is used for compression. Many possible compression algorithms are well known, but in one embodiment of the invention, LZW compression is used. The lookup table for the VPN, of which the source and destination addresses are members, also identifies the particular encryption algorithm used for data packets traversing the Internet for the VPN. The lookup table additionally identifies the authentication and the key management protocol information which is used. As an alternative to lookup tables, the VPN unit may be programmed to always use the same algorithms for all VPNs.

The particular packet processing algorithms to be used for VPN traffic may vary, so long as the lookup tables in both the sending and receiving VPN units identify the same compression, encryption and authentication rules and are capable of implementing them for members of the same group.

Note that a single VPN unit may serve multiple VPNs, and that particular network addresses may be members of multiple VPNs. Thus, at state 240, when a packet is destined from one member of the VPN to another, the packet is processed according to the compression, encryption and authentication rules identified in the VPN unit tables for that particular VPN. Then, at state 250, the processed packet is forwarded toward the destination address over the Internet. The sending procedure ends at state 260.

Figure 3:
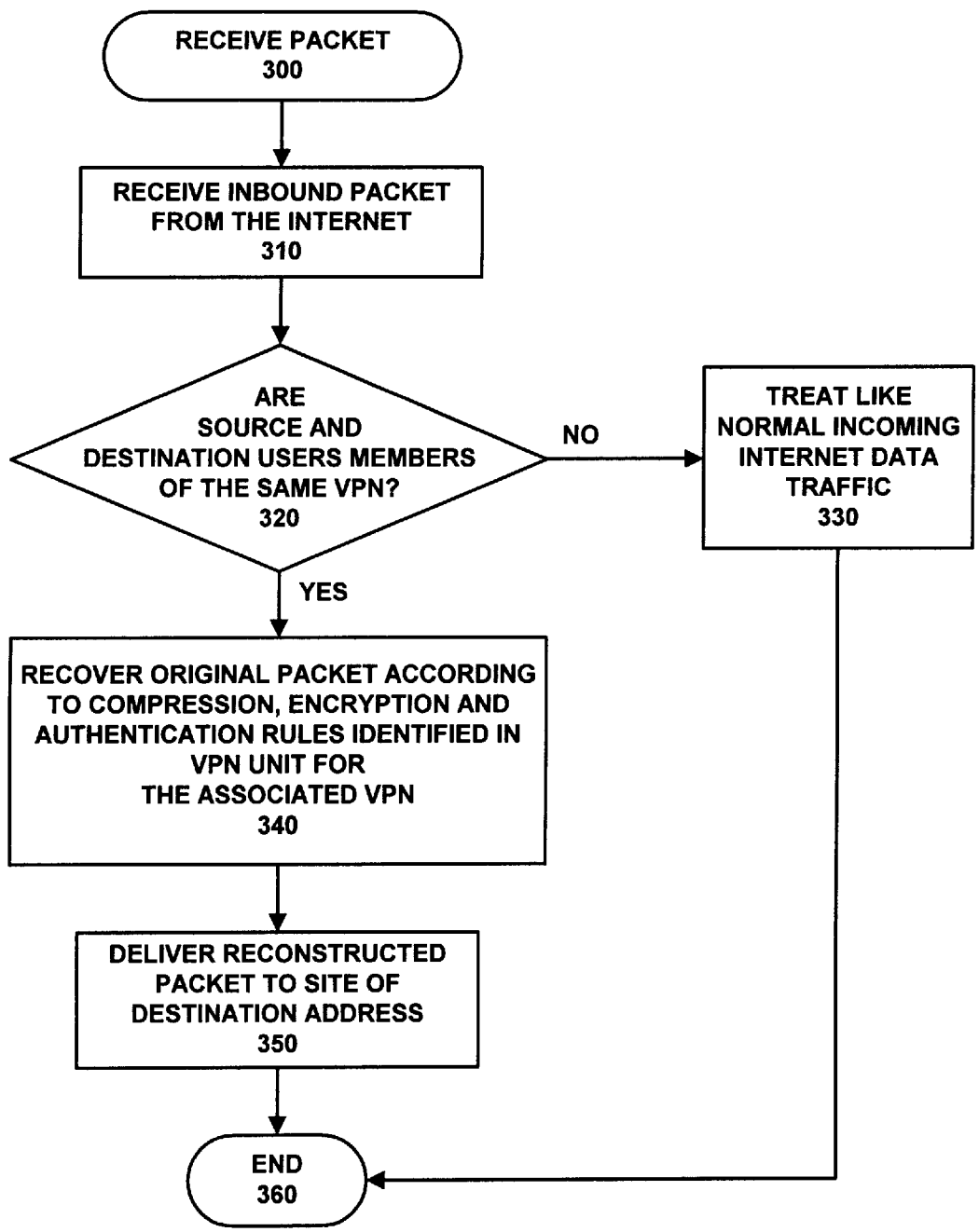
FIG. 3 is a flow chart illustrating the processing of a packet being received over a public data network by one member of a VPN from another member of the VPN in accordance with an aspect of the present invention.

FIG. 3 is a flow chart illustrating the processing of a packet being received over a public data network by one member of a VPN from another member of the VPN in accordance with an embodiment of the present invention. This packet receiving procedure 300 begins at state 310 when an inbound data packet is received from the Internet at the receiving VPN unit. At decision box 320, the inbound data packet is examined to determine if the source and destination addresses of the data packet are both members of the same VPN. (It is assumed that the lookup tables maintained by all of the VPN units are both consistent.) If the inbound data packet is determined not to be VPN traffic, then the packet is passed through and forwarded to the receiving site as though it were normal Internet data traffic at state 330. The system then proceeds to state 360, which is an end state. In an alternative embodiment, the system discards incoming data traffic that is not from an identified member of a VPN supported by the VPN unit. In another embodiment, the system provides the option to either pass or discard non-VPN group data traffic.

For data packets that are determined to be VPN traffic at decision box 320, the VPN unit processes the inbound packet to recover the original data packet as it was provided from the source endstation. The lookup table maintained by the receiving VPN unit identifies the compression, encryption and authentication rules used for the VPN and reconstructs the original IP packet in accordance with those rules at state 340. Then, the reconstructed packet will be delivered to the site of the destination address at state 360. The system then proceeds to state 360, which is an end state.

Description of VPN Management Station

Figure 4:
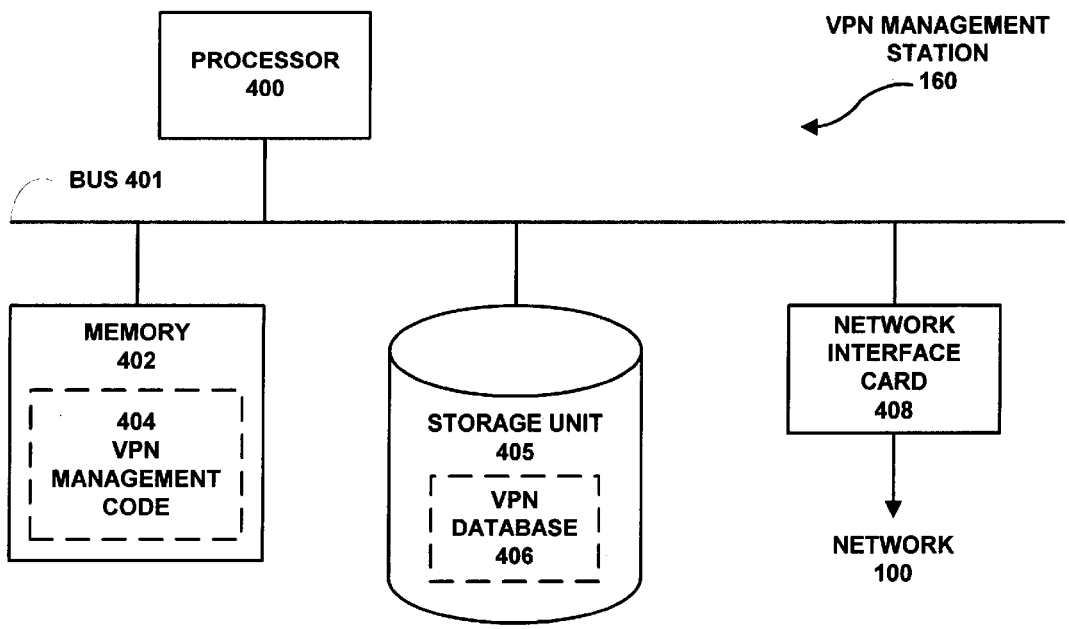
FIG. 4 is a block diagram illustrating part of the internal structure of VPN management station 160 from FIG. 1 in accordance with an aspect of the present invention.

FIG. 4 is a block diagram illustrating part of the internal structure of VPN management station 160 in accordance with an embodiment of the present invention. In general, VPN management station 160 may be any type of computational system coupled to public network 100. In the embodiment illustrated in FIG. 4, VPN management station 160 includes processor 400 coupled to memory 402, storage unit 405 and network interface card 408 through bus 401. Memory 402 includes VPN management code 404, which contains instructions and data to manage VPN units coupled to network 100. Storage unit 405 includes database 406, which includes information reflecting the structure of virtual private networks supported by the system as well as the configuration of the VPN units supported by VPN management station 160. Network interface card 408 couples VPN management station 160 to network 100. The operations performed by VPN management station 160 are discussed in more detail below.

Figure 5:
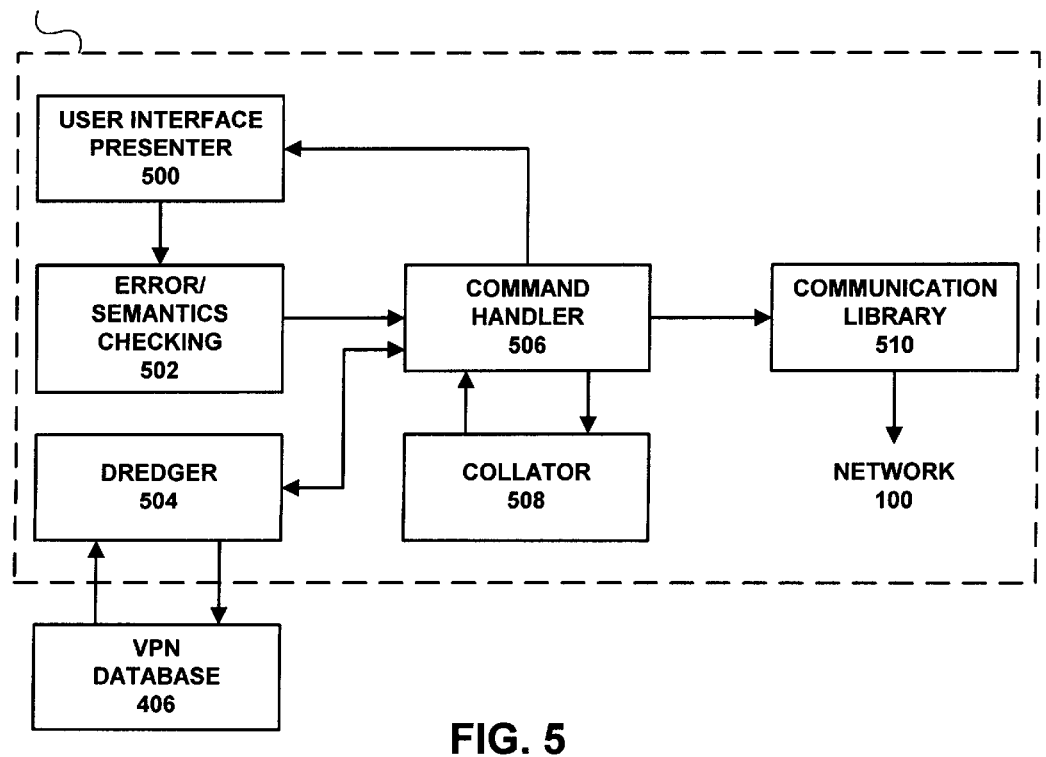
FIG. 5 is a block diagram of the software architecture contained within VPN management station 160 from FIG. 1 in accordance with an aspect of the present invention.

FIG. 5 is a block diagram of part of the software architecture contained within VPN management station 160 in accordance with an embodiment of the present invention. As noted above, VPN management station 160 includes VPN management code 404 in memory 402 and VPN database 406 on storage unit 405. VPN management code 404 includes user interface presenter 500, which receives input from a system user. This input feeds through error/semantics checking module 502 before feeding into command handler 506. Command handler 506 is coupled to dredger 504, collator 508 and communication library 510. Command handler 506 executes the commands received through user interface presenter 500 by manipulating dredger 504, collator 508 and communication library 510. Dredger 504 is coupled to and performs searches through and performs updates to VPN database 406. Communication library 510 contains functions to communicate with network 100. Collator 508 sorts and manipulates network addresses to produce configuration information for VPN units.

During operation, the system outlined in FIG. 5 operates as follows. A system user inputs a command into user interface presenter 500. This command feeds through error/semantics checker module 502 before arriving at command handler 506. Command handler 506 may present additional screens or queries to the user through user interface presenter 500. Command handler then retrieves information regarding the groups of nodes, VPNs and VPN units affected by the command. Command handler 506 takes this information and uses it to produce configuration information for VPN units using collator 508. This configuration information is communicated to the VPN units using functions from communication library 510, which communicate across network 100.

Description of High Level Objects

Figure 6:
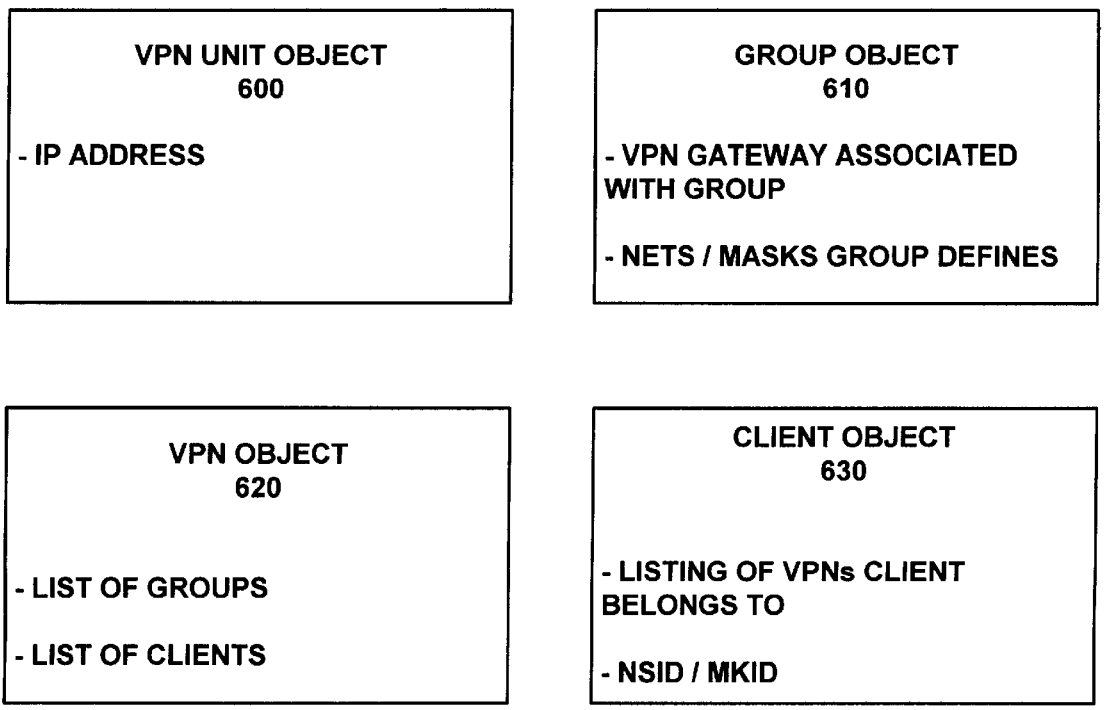
FIG. 6 is a diagram of some of the data objects operated on by high-level commands in accordance with an aspect of the present invention.

FIG. 6 is a diagram of some of the data objects operated on by high-level commands in accordance with an embodiment of the present invention. FIG. 6 includes VPN unit object 600, group object 610, VPN object 620 and client object 630. A user manipulating VPN management station 160 specifies sequences of operations on the above-listed objects. Hence, the user does not have to directly manipulate lower level addressing information to configure VPN units. This lower level addressing information is automatically generated by VPN management station 160 and sent to the VPN units. A VPN unit object 600 is created for each VPN unit in the network. A VPN unit object comprises a number of parameters including the Internet Protocol (IP) address of the V PN unit. A group object 610 is created for groups of network nodes on public network 100. In this embodiment, a group object includes an identifier for the VPN unit associated with the group and the net/mask pairs the group defines. A VPN object 620 is created for each virtual private network supported by VPN management station 160. A VPN object 620 comprises a number of attributes including, algorithms for encryption, authentication and compression, a list of groups and a list of remote clients included in the underlying VPN. A client object 630 is created for each remote client supported by VPN management station 160. A client object comprises a number of attributes including a listing of the virtual private networks the client belongs to and the NSID/MKID identifier for the remote client. In one embodiment, the NSID, or name space ID is the MD5 hash of a user name, and the MKID is the master key ID of the domain. These serve to identify the remote client.

Description of Operating System

Figure 7:
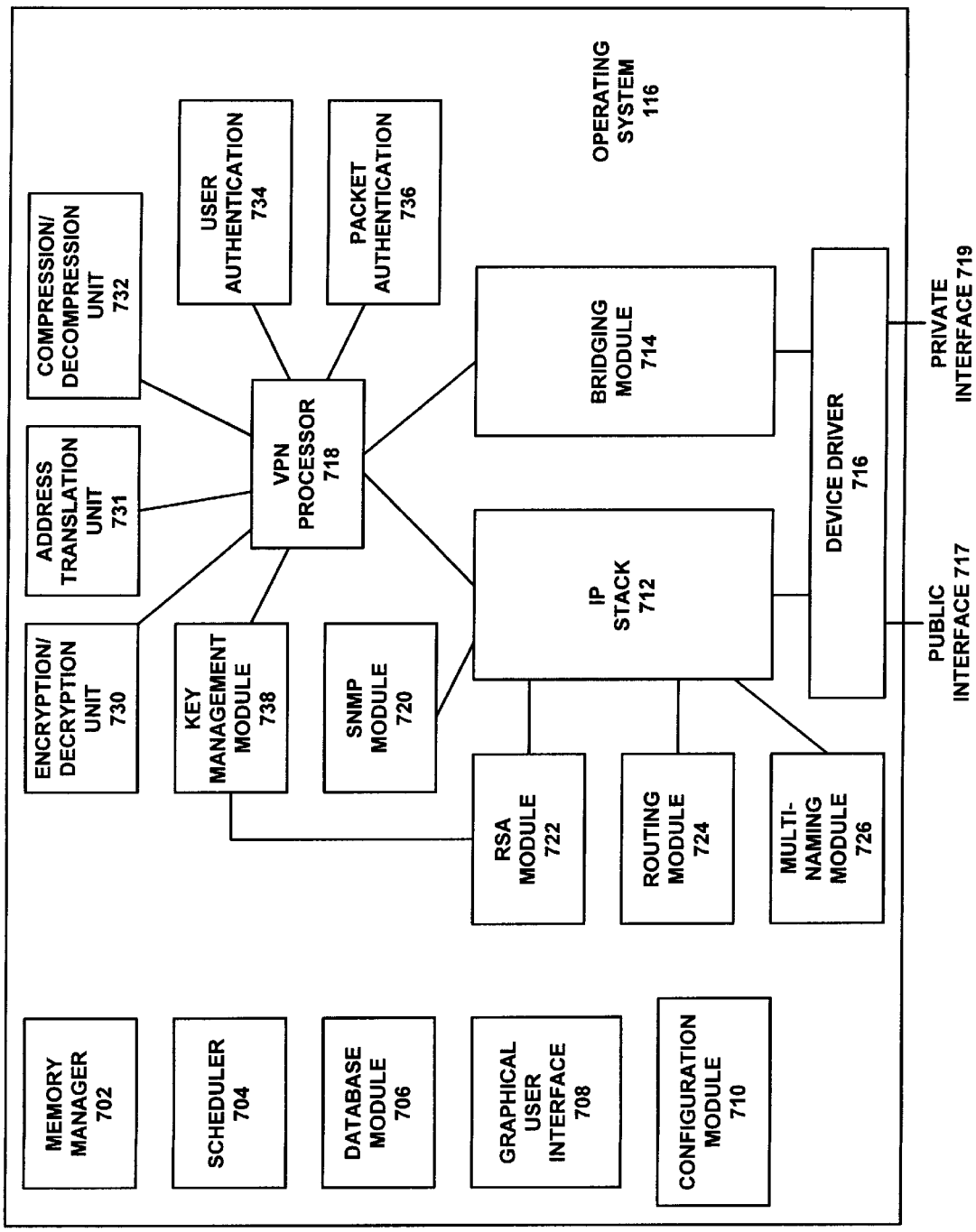
FIG. 7 is a block diagram of operating system 116 from FIG. 1 in accordance with an aspect of the present invention.

FIG. 7 is a block diagram of operating system 116 from FIG. 1 in accordance with an aspect of the present invention. Operating system 116 includes a number of modules, the most central of which is VPN processor 718, which controls the operation of operating system 116.

In the illustrated embodiment, VPN processor 718 communicates with a number of modules, including IP stack 712 and bridging module 714. IP stack 712 and bridging module are coupled through device driver 716 to private interface 719 and public interface 717. Public interface 717 is coupled to a public network, such as public network 100 from FIG. 1. Private interface 719 is coupled to a private network, such as LAN 110 from FIG. 1. The function of operating system 116 is to filter and manipulate communications between public network 100 and LAN 110. Device driver 716 facilitates communications with public interface 717 and private interface 719. In one embodiment, device driver 716 facilitates communications using the 10-BASE-T protocol.

Bridging module 714 provides a logical connection between private interface 719 and public interface 717. In one embodiment, bridging module 714 does so by supporting level two bridging of medium access control (MAC) addresses. Note that bridging operations are selectively controlled by VPN processor 718 so that communications within a VPN are encrypted before being transmitted across public network 100.

IP stack 712 handles the protocol layers involved in translating communications from public interface 717 and private interface 719 into a form suitable for manipulation by VPN processor 718. A number of modules are coupled to IP stack 712, including multi-naming module 726, routing module 724, RSA module 722, and SNMP module 720. Multi-naming module 726 provides multiple Internet Protocol (IP) addresses for VPN unit 115 (from FIG. 1), which is controlled by operating system 116. Routing module 724 performs standard network routing functions for VPN unit 115. More specifically, routing module 724 determines where messages should be forwarded to next in their journey to their ultimate destination. RSA module 722 provides public key/private key security functions, including exchanging of certificates for authentication functions with remote entities. Among its other functions, RSA module 722 supports management of encryption keys and loading of configuration information into VPN unit 115 from VPN management station 160 (from FIG. 1). To this end, RSA module 722 communications with key management module 738, which itself communicates with VPN processor 718. Key management module 738 sets up keys for encryption and authentication functions. Simple Network Management Protocol SNMP module 720 gathers information and statistics from IP stack 712 that a system administrator might be interested in, such as communication traffic statistics.

VPN processor 718 is additionally coupled to other modules including, encryption-decryption unit 730, address translation unit 731, compression-decompression unit 732, user authentication module 734 and packet authentication module 736.

Encryption-decryption unit 730 encrypts and decrypts communications sent and received through public interface 717. In one embodiment, encryption-decryption unit 730 includes an application specific integrated circuit (ASIC) that performs the encryption and decryption operations.

Address translation unit 731 supports translation from private addresses to public addresses, so that communications on LAN 110 can be converted into a form suitable for transmission across public network 100. More specifically, address translation unit 731 supports static translation, dynamic translation and port translation. In order to perform these functions address translation unit 731 includes pointers from IP stack 712, bridging module 714 and VPN processor 718. In one embodiment, address translation unit 731 additionally implements access control functions that specify they types of communications that are allowed to pass through associated VPN unit 115.

Compression-decompression unit 732 provides compression and decompression functions for data sent across public network 100. In one embodiment, compression-decompression unit 732 includes special-purpose hardware to perform the compression and decompression functions.

User authentication module 734 authenticates system user, whereas packet authentication module 736 authenticates individual packet.

Configuration module 710 is coupled a number of functional units within operating system 116. It facilitates the loading of configuration information from VPN management station 160 (from FIG. 1) into VPN unit 115. This configuration information includes information specifying how to implement the VPNs defined by the system.

Additionally a number of operating system functions are performed by other modules within operating system 116. Memory manager 702 performs memory management functions. Scheduler 704 schedules tasks within operating system 116. Database module 706 stores configuration and other information for operating system 116. Graphical user interface module 708 facilitates communication with a user of VPN unit 115. The above-listed modules for performing operating system functions are widely used by other modules within operating system 116.

Description of Address Translation

Figure 8:
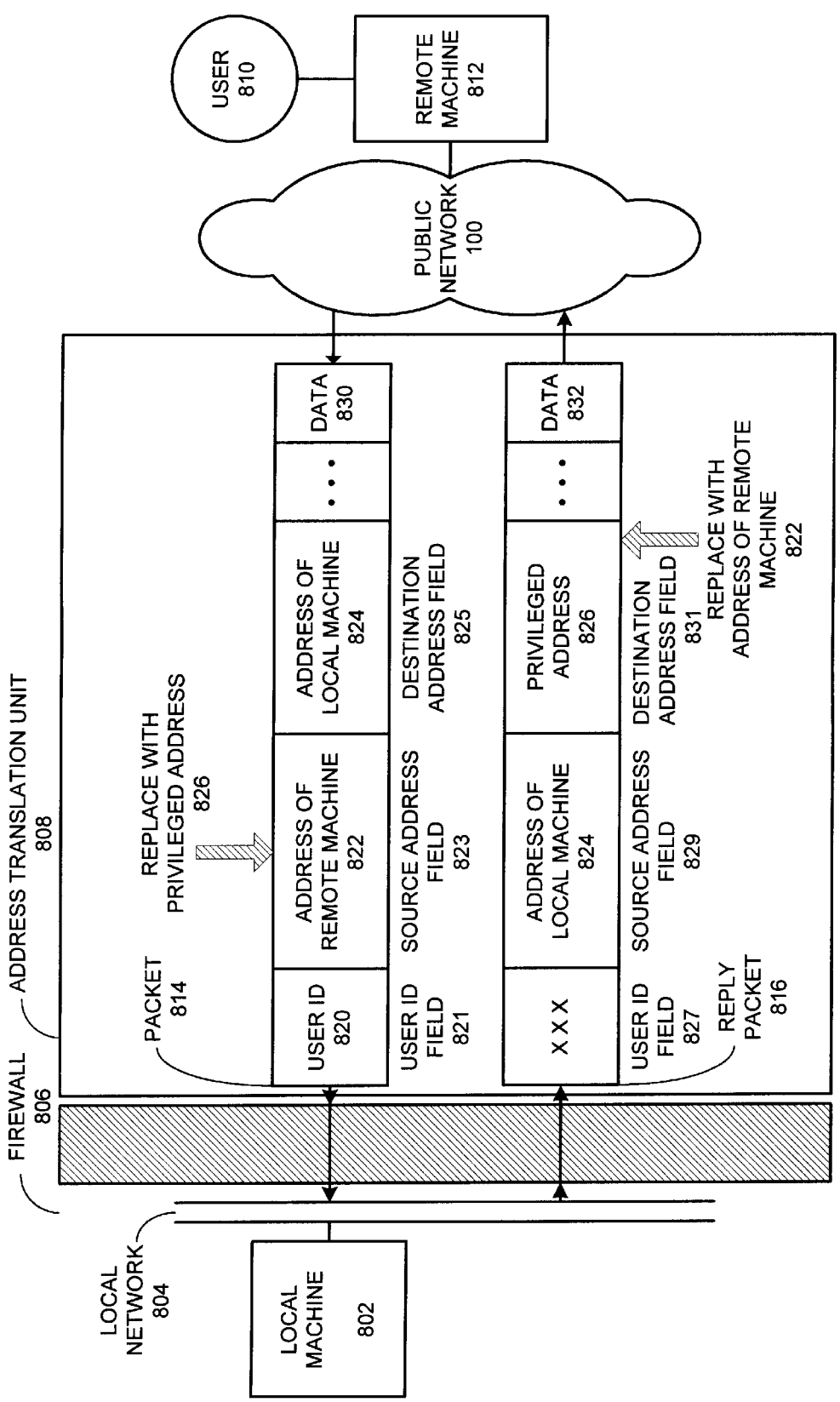
FIG. 8 is a diagram illustrating the process of address translation in accordance with an aspect of the present invention.

FIG. 8 is a diagram illustrating the process of address translation in accordance with an aspect of the present invention. In the illustrated embodiment, user 810 on remote machine 812 sends a packet 814 to address translation unit 808 through public network 100. User 810 may be any type of user of a computer system. Remote machine 812 may be any type of computer that can be coupled to public network 100. Address translation unit 808 may be one of a number of different types of address translation units. In one embodiment, address translation unit 808 is part of a router for routing communications across a computer network. In another embodiment, address translation unit 808 is inside a virtual private network unit (see address translation unit 731 in FIG. 7). As illustrated in FIG. 8, packet 814 includes user ID field 821, source address field 823 and destination address field 825. User ID field 821 includes user ID 820, which identifies user 810 on remote machine 812. Source address field 823 includes address of remote machine 822 and destination address field 825 includes address of local machine 824.

From address translation unit 808, packet 814 passes through firewall 806 across local network 804 to local machine 802. Firewall 806 may be any type of security mechanism that restricts communications between public network 100 and local network 804. Note that in some embodiments, the present invention primarily facilitates load balancing between VPN units. For these embodiment, firewall 806 may not exist. Local network 804 may be any type of local area or wide area network. Local machine 802 may be any type of computing system capable of connecting to local network 804.

In the reverse direction, reply packet 816 passes from local machine 802, through firewall 806 into address translation unit 806. Reply packet 816 is then forwarded across public network 100 to user 810 on remote machine 812. Reply packet 816 includes a user ID field 827, source address field 829 and destination address field 831. As illustrated, user ID field 827 may contain nothing. However, in another embodiment, the system places user ID 820 in user ID field 827. Source address field 829 includes address of local machine 824. Destination address field 831 includes privileged address 826.

Address translation unit 808 operates generally as follows. When packet 814 passes through address translation unit 808, address of remote machine 822 in source address field 823 is replaced with privileged address 826. This enables packet 814 to pass through firewall 806. When reply packet 816 passes through address translation unit 808, privileged address 826 in source address field 831 is replaced with address of remote machine 822, and user ID field 827 is loaded with user ID 820. This enables reply packet 816 to be forwarded to user 810 on remote machine 812. The operation of address translation unit 808 is described in more detail below with reference to FIGS. 9 and 10.

Example of Operation

Figure 9:
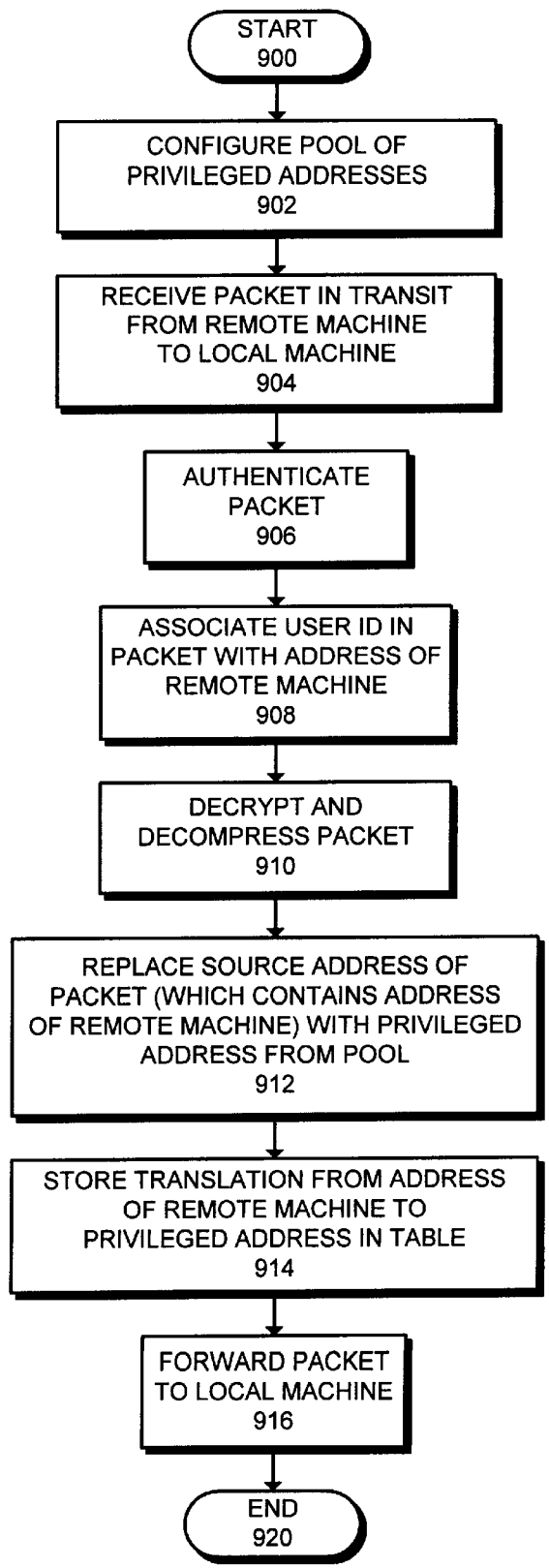
FIG. 9 is a flow chart illustrating some of the operations performed by the system in processing a packet sent by a user from a remote machine to a local machine in accordance with an aspect of the present invention.

FIG. 9 is a flow chart illustrating some of the operations performed by the system in processing a packet sent by a user from a remote machine to a local machine in accordance with an aspect of the present invention. The system starts in state 900 and proceeds to state 902. In state 902, the system configures a pool of privileged addresses. In one embodiment, each address translation unit creates a single pool of privileged addresses for all local networks that the address translation unit serves. In another embodiment, each address translation unit creates a separate pool of privileged addresses for each local network that the address translation unit serves. In a variation on the above embodiments, configuring the pool of privileged address includes selecting a range of privileged addresses to include in the pool of privileged addresses. The system next proceeds to state 904. In state 904, the system receives packet 814 in transit between remote machine 812 and local machine 802. This packet includes user ID field 821, which contains user ID 820.

The system next proceeds to state 906, in which the system authenticates the packet. This authentication process may entail authenticating user 810 and/or remote machine 812. Authentication may be accomplished purely through information transferred between remote machine 812 and address translation unit 808, or through communications with an external authentication service. In one embodiment of the present invention, address translation unit 808 makes use of user ID 820 to lookup an authentication key for user 810, which is used to authenticate packet 814. Packet 814 may include an authentication field (not shown in FIG. 8) that includes some type of encrypted checksum for the packet that can be authenticated with the authentication key. The system proceeds to state 908.

In state 908, the system associates user ID 820 with address of remote machine 822. The system stores this association so that subsequent packets with the same user ID 820 can be checked to ensure that they originate from the same remote machine 812. If a subsequent packet with the same user ID 820 does not originate from the same address, an adversary may be attempting to pass himself off as user 810. In this case, the system takes appropriate action to deal with the potential network attack. The system next proceeds to state 910 In state 910, once the packet is authenticated, the system decrypts and, if necessary, decompresses the packet. The system next proceeds to state 912.

In state 912, the system replaces address of remote machine 822 in source address field 823 with privileged address 826. Privileged address 826 enables packet 814 to pass through firewall 806. The system then proceeds to state 914. In state 914, the system stores the translation in a lookup structure. The entry that is created in this lookup structure includes user ID 820, address of remote machine 822 and privileged address 826. This lookup structure allows lookups to be performed using either user ID 820 or privileged address 826. The system next proceeds to state 916 in which the system forwards packet 814 to local machine 802 across local network 804. The system then proceeds to state 920, which is an end state. The above process repeated in essentially the same way for all subsequent packets from user 810 on remote machine 812, except that for subsequent packets, privileged address 826 is simply looked up in the translation table.

Figure 10:
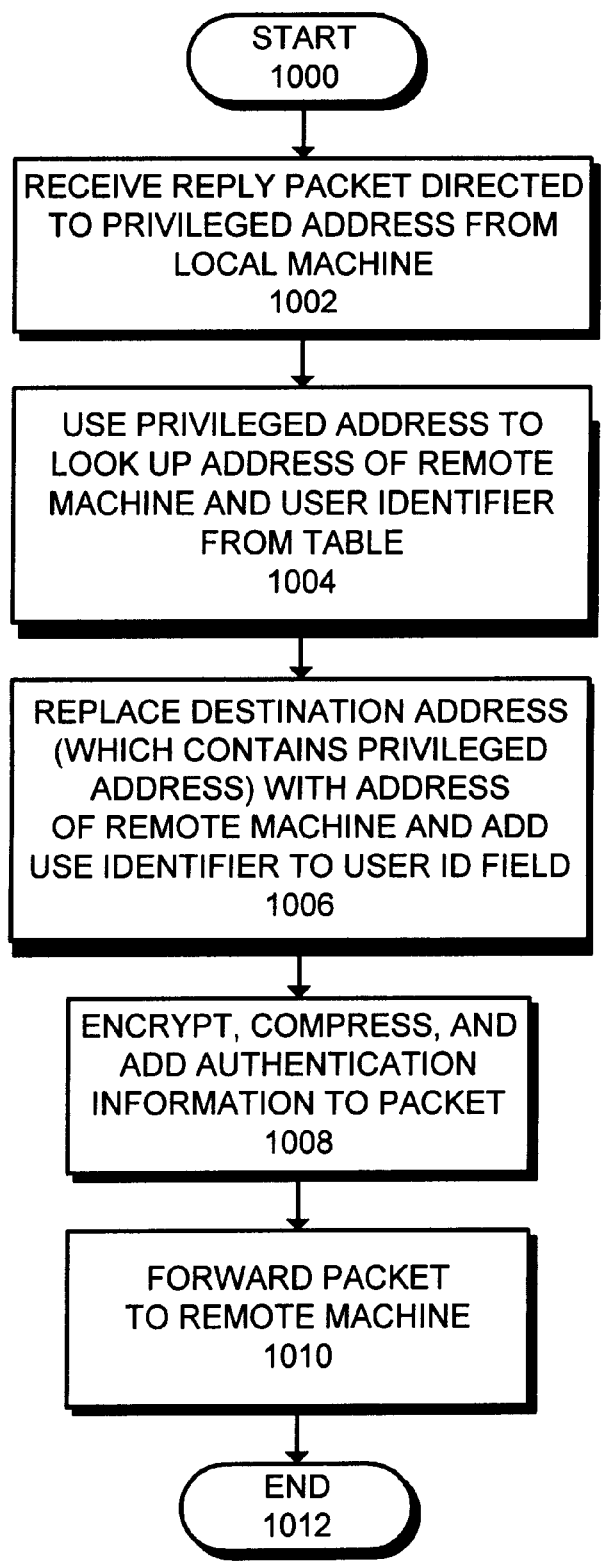
FIG. 10 is a flow chart illustrating some of the operations performed by the system in processing a reply packet sent from a local machine to a user on a remote machine in accordance with an aspect of the present invention.

FIG. 10 is a flow chart illustrating some of the operations performed by the system in processing a reply packet sent from a local machine to a user on a remote machine in accordance with an aspect of the present invention. The system starts in state 1000 and proceeds to state 1002. In state 1002, the system receives a reply packet 816 directed to privileged address 826. In one embodiment of the present invention, this may involve acting as an address resolution protocol (ARP) proxy for the privileged address, which entails responding to an ARP request for privileged address 826 and supplying a hardware address for address translation unit 808 on local network 804. This hardware address is then used by local machine 802 to send reply packet 816 to address translation unit 808. The system next proceeds to state 1004. In state 1004, the system uses privileged address 826 from destination address field 831 to look up the address 822 of remote machine 812, and to look up user ID 820 associated with user 810. The system next proceeds to state 1006. In state, 1006, the system replaces privileged address 826 in destination address field 831 with address of remote machine 822, and inserts user ID 820 in user ID field 827. The system next proceeds to state 1008. In state 1008, the system encrypts, optionally compresses, and adds authentication information to reply packet 816. (Note that encryption and decryption of packet 814 and reply packet 816 are not part of the address translation feature of the present invention. One embodiment of the present invention provides no such encryption or decryption.) The system next proceeds to state 1008. In state 1008, the system forwards reply packet 816 across public network 100 to remote machine 812. The system next proceeds to state 1012, which is an end state.

According to another aspect of the present invention, address translation facilitates load balancing for systems that use multiple address translation units (or VPN units) to link local network 804 to public network 100. According to this aspect, privileged addresses are associated with particular address translation units. Hence, when a specific privileged address is placed in source address field 823 of packet 814, it causes reply packet 816 to return through the associated address translation unit. By assigning privileged addresses to packets properly, the system can balance load across multiple address translation units (or VPN units).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for translating addresses for a data packet based upon a user identifier in the data packet in order to forward the data packet through a firewall, comprising:

receiving the data packet sent by a user from a source node outside the firewall to a protected destination node within the firewall, the data packet including, a source address of the source node, a destination address of the protected destination node and the user identifier that identifies the user;

reading the user identifier from the data packet;

using the user identifier to determine communication privileges associated with the user;

replacing the source address in the data packet with a privileged address from a set of privileged addresses recognized by the firewall if the communication privileges allow the user to communicate with the protected destination node;

wherein the firewall is configured to allow only data packets from the set of privileged addresses to pass through the firewall; and forwarding the data packet to the protected destination node through the firewall;

whereby the privileged address in the source field of the data packet allows the data packet to pass through the firewall.

2. The method of claim 1, further comprising:

receiving a reply packet from the protected destination node directed to the privileged address through the firewall;

replacing the privileged address in the reply packet with the source address so that the reply packet is directed to the source node; and forwarding the reply packet to the source node.

3. The method of claim 2, wherein receiving the reply packet includes acting as a proxy for the privileged address under the address resolution protocol.

4. The method of claim 1, further comprising authenticating the data packet by looking up an authentication key for the data packet, and using the authentication key to authenticate the data packet.

5. The method of claim 4, wherein looking up the authentication key includes looking up the authentication key based upon the user identifier.

6. The method of claim 1, further comprising encrypting the data packet.

7. The method of claim 1, further comprising:

associating the user identifier with the source node; and if a packet is subsequently received with the user identifier from a node other than the source node, indicating a possible network attack.

8. The method of claim 1, wherein receiving the data packet includes receiving the data packet at a virtual private network unit, the virtual private network unit being coupled to a public network and providing secure communications on the public network for communications that pass through the virtual private network unit.

9. The method of claim 1, wherein receiving the data packet includes receiving the data packet at a network router.

10. The method of claim 1, wherein the privileged address is retrieved from a pool of privileged addresses.

11. The method of claim 1, wherein the source node is a remote client that can assume different source addresses for different connection sessions.

12. A method for translating addresses for a data packet based upon a user identifier in the data packet in order to forward the data packet through a firewall, comprising:

receiving the data packet sent by a user from a source node outside the firewall to a protected destination node within the firewall, the data packet including, a source address of the source node, a destination address of the protected destination node and the user identifier that identifies the user;

reading the user identifier from the data packet;

authenticating the data packet by looking up an authentication key for the data packet using the user identifier, and using the authentication key to authenticate the data packet;

using the user identifier to determine communication privileges associated with the user;

replacing the source address in the data packet with a privileged address from a set of privileged addresses recognized by the firewall if the communication privileges allow the user to communicate with the protected destination node;

wherein the firewall is configured to allow only data packets from the set of privileged addresses to pass through the firewall;

forwarding the data packet to the protected destination node through the firewall;

whereby the privileged address in the source field of the data packet allows the data packet to pass through the firewall;

receiving a reply packet from the protected destination node directed to the privileged address through the firewall;

replacing the privileged address in the reply packet with the source address so that the reply packet is directed to the source node; and forwarding the reply packet to the source node.

13. The method of claim 12, further comprising encrypting the data packet.

14. An apparatus that translates addresses for a data packet based upon a user identifier in the data packet in order to forward the data packet through a firewall, comprising:

a packet receiving mechanism, for receiving the data packet sent by a user from a source node outside the firewall to a protected destination node within the firewall, the data packet including, a source address of the source node, a destination address of the protected destination node and the user identifier that identifies the user;

a packet storage unit, coupled to the packet receiving mechanism, for storing the data packet;

a communication privilege determination mechanism, in communication with the packet storage unit, that is configured to determines communication privileges associated with the user based upon the user identifier;

a replacement mechanism, in communication with the packet storage unit, that replaces the source address in the data packet with a privileged address from a set of privileged addresses recognized by the firewall if the communication privileges allow the user to communicate with the protected destination node;

wherein the firewall is configured to allow only data packets from the set of privileged addresses to pass through the firewall; and a packet forwarding unit, coupled to the packet storage unit, that forwards the data packet to the protected destination node through the firewall;

whereby the privileged address in the source field of the data packet allows the data packet to pass through the firewall.

15. The apparatus of claim 14, further comprising:

a reply receiving mechanism, for receiving a reply packet from the protected destination node directed to the privileged address through the firewall; and wherein the replacement mechanism is configured to replace the privileged address in the reply packet with the source address so that the reply packet is directed to the source node.

16. The apparatus of claim 15, wherein the reply receiving mechanism is configured to act as a proxy for the privileged address under the address resolution protocol.

17. The apparatus of claim 14, further comprising an authentication mechanism, coupled to the packet storage unit, for authenticating the data packet.

18. The apparatus of claim 17, wherein the authentication mechanism is configured to look up the authentication key based upon the user identifier.

19. The apparatus of claim 14, further comprising an encryption mechanism in communication with the packet storage unit, for encrypting the packet.

20. The apparatus of claim 14, further comprising a user identifier association unit, for associating the user identifier with the source node, and if a data packet is subsequently received with the user identifier from a node other than the source node, indicating a possible network attack.

21. The apparatus of claim 14, wherein the apparatus is part of a virtual private network unit, the virtual private network unit being coupled to a public network and providing secure communications on the public network for communications that pass through the virtual private network unit.

22. The apparatus of claim 14, wherein the apparatus is part of a network router.

23. The apparatus of claim 14, wherein the replacement mechanism is configured to retrieve the privileged address from a pool of privileged addresses.

24. The apparatus of claim 14, wherein the source node is a remote client that can assume different source addresses for different connection sessions.

25. A program storage device storing instructions that when executed by a computer perform a method for translating addresses for a data packet based upon a user identifier in the data packet in order to forward the data packet through a firewall, the method comprising:

receiving the data packet sent by a user from a source node outside the firewall to a protected destination node within the firewall, the data packet including, a source address of the source node, a destination address of the protected destination node and the user identifier that identifies the user;

reading the user identifier from the data packet;

using the user identifier to determine communication privileges associated with the user;

replacing the source address in the data packet with a privileged address from a set of privileged addresses recognized by the firewall if the communication privileges allow the user to communicate with the protected destination node;

wherein the firewall is configured to allow only data packets from the set of privileged addresses to pass through the firewall; and forwarding the data packet to the protected destination node through the firewall;

whereby the privileged address in the source field of the data packet allows the data packet to pass through the firewall.

* * * * *